United States Patent
Su (10) Patent No.: US 10,252,411 B2
(45) Date of Patent: Apr. 9, 2019

(54) TOOL RACK (71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

(*) Notice: Subject to any disclaimer, the term of this patent is extended or adjusted under 35 U.S.C. 154(b) by 0 days.

(21) Appl. No.: 15/849,921

(22) Filed: Dec. 21, 2017

(65) Prior Publication Data
US 2018/0200877 A1  Jul. 19, 2018

(30) Foreign Application Priority Data

Jan. 13, 2017 (TW) ............................. 106101208 A
Sep. 15, 2017 (TW) ............................. 106131844 A (51) Int. Cl.
B25H 3/04 (2006.01)
F16B 1/00 (2006.01)
F16B 2/22 (2006.01)

(52) U.S. Cl.
CPC ............... *B25H 3/04* (2013.01); *F16B 1/00* (2013.01); *F16B 2/22* (2013.01); *F16B 2001/0035* (2013.01); *Y10S 211/01* (2013.01)

(58) Field of Classification Search
CPC .......... B25H 3/04; B25H 3/003; B25H 3/006; B25H 3/06; F16B 1/00; F16B 2/22; F16B 2001/0035; A47F 7/0028; A47F 5/08; Y10S 211/01
USPC ........ 211/70.6, 87.01, DIG. 1; 248/350, 683, 248/206.5, 309.4; 220/483; 206/349, 206/350, 372, 376, 377, 378, 818, 375, 206/373
See application file for complete search history.

(56) References Cited

U.S. PATENT DOCUMENTS

| | | | | |
|---|---|---|---|---|
| 4,058,357 A | * | 11/1977 | Wallace | B60R 11/0205 211/DIG. 1 |
| 4,771,897 A | * | 9/1988 | Ho | A47G 29/10 211/85.9 |
| 4,792,051 A | * | 12/1988 | Miller | A47F 5/005 108/61 |
| 4,899,894 A | * | 2/1990 | Crump | A47B 81/00 211/70.2 |
| 5,316,143 A | * | 5/1994 | Horn | B25H 3/06 206/350 |
| 5,979,675 A | * | 11/1999 | Moriarty | B01L 9/54 211/119.003 |

(Continued)

FOREIGN PATENT DOCUMENTS

TW  I226276 B  1/2005

*Primary Examiner* — Jennifer E. Novosad
(74) *Attorney, Agent, or Firm* — Alan D. Kamrath; Kamrath IP Lawfirm, P.A.

(57) ABSTRACT

A tool rack includes a main body and a magnetic assembly. The main body includes a first face, at least one first clamping portion disposed at an end of the first face, and a receiving space disposed at another end of the first face and forming an opening. The magnetic assembly includes at least one magnetic member arranged in the receiving space of the main body. A portion of a tool can be clamped by the first clamping portion, and another portion of the tool can be attached to the magnetic member via a magnetic force to prevent the tool from being detached from the tool rack due to vibration or swaying.

6 Claims, 9 Drawing Sheets

(56) References Cited

U.S. PATENT DOCUMENTS

| | | | | |
|---|---|---|---|---|
| 6,216,888 B1* | 4/2001 | Chien | B23Q 3/1546 | 211/70.6 |
| 6,257,409 B1* | 7/2001 | Lin | B25H 3/04 | 206/376 |
| 6,315,121 B1* | 11/2001 | Hansen | B25H 3/04 | 206/376 |
| 6,409,030 B1* | 6/2002 | Schlemper | D05C 15/20 | 112/80.45 |
| 6,431,373 B1* | 8/2002 | Blick | B25H 3/003 | 206/378 |
| 6,571,966 B1* | 6/2003 | Hsiao | A47F 7/0028 | 206/379 |
| 6,637,606 B1* | 10/2003 | Chen | B25H 3/04 | 206/372 |
| 6,679,391 B1* | 1/2004 | Huang | B25H 3/04 | 206/372 |
| 6,811,127 B1* | 11/2004 | Shiao | B25H 3/04 | 211/70.6 |
| 6,923,317 B2* | 8/2005 | Coleman, Jr. | B25H 3/003 | 206/350 |
| 7,080,733 B2* | 7/2006 | Kao | B25H 3/04 | 206/372 |
| 8,398,155 B2* | 3/2013 | Andochick | B60R 11/00 | 224/483 |
| 8,550,235 B2* | 10/2013 | Suderman | F16B 7/0433 | 198/690.1 |
| 9,126,329 B2* | 9/2015 | Kao | B25H 3/04 | |
| 9,205,552 B2* | 12/2015 | Kao | F16M 13/022 | |
| 9,827,663 B2* | 11/2017 | Kao | B25H 3/04 | |
| 2001/0001197 A1* | 5/2001 | Ramsey | B25H 3/06 | 206/378 |
| 2001/0010291 A1* | 8/2001 | Hu | B25H 3/003 | 206/377 |
| 2003/0010733 A1* | 1/2003 | Ling | A47F 7/00 | 211/70.6 |
| 2003/0141266 A1* | 7/2003 | Lin | B25H 3/04 | 211/70.6 |
| 2010/0044327 A1* | 2/2010 | Vecchio | B25H 3/04 | 211/70.6 |
| 2010/0163502 A1* | 7/2010 | Chang | B25H 3/04 | 211/70.6 |
| 2010/0258515 A1* | 10/2010 | Chen | A47F 7/00 | 211/70.6 |
| 2011/0174752 A1* | 7/2011 | Liao | A47F 5/0838 | 211/70.6 |
| 2011/0192810 A1* | 8/2011 | Kao | B25H 3/028 | 211/70.6 |
| 2011/0226713 A1* | 9/2011 | Su | B25H 3/003 | 211/70.6 |
| 2013/0153521 A1* | 6/2013 | Kao | B25H 3/04 | 211/70.6 |

\* cited by examiner

TOOL RACK

BACKGROUND OF THE INVENTION

The present invention relates to a tool rack and, in particular, to a tool rack which can safely and securely attach tools.

Taiwan Patent No. I226276 discloses a tool rack, which is provided at a side thereof with clamp portions having two hooks, whereby wrenches may be placed in the clamp portion.

However, a wrench is attached to the above tool rack by two hooks of one clamp portion to cause the wrench to be easily and unexpectedly detached from the clamp portion due to vibration or swaying.

Thus, a need exists for a novel tool rack with easily recognizable size indicia to mitigate and/or obviate the above disadvantages.

SUMMARY OF THE INVENTION

A tool rack according to the present invention includes a main body and a magnetic assembly. The main body includes a first face extending along a virtual straight line, at least one first clamping portion disposed at an end of the first face and extending along a direction perpendicular to the virtual straight line, and a receiving space disposed at another end of the first face and forming an opening. The magnetic assembly includes at least one magnetic member arranged in the receiving space. A portion of a tool can be clamped by the first clamping portion, and another portion of the tool can be attached to the magnetic member via a magnetic force to prevent the tool from being detached from the tool rack due to vibration or swaying.

DETAILED DESCRIPTION OF THE INVENTION

FIGS. 1-5 show a tool rack of a first embodiment according to the present invention. The tool rack includes a main body 10 and a magnetic assembly 20 mounted on main body 10. A tool includes a first portion clamped by main body 10, and a second portion attached to magnetic assembly 20 via a magnetic force to prevent tool A from being detached from the tool rack due to vibration or swaying. Tool A includes a first end A1, a rod body A2, and a second end A3. First end A1 and rod body A2 are respectively disposed at two opposite ends of tool A, and rod body A2 is located between first end A1 and second end A3.

Main body 10 extends along a virtual straight line L and includes a first face 101, a second face 102, and a third face 103. First face 101 and second face 102 extend along a virtual straight line L and are respectively disposed at two opposite sides of main body 10 and parallel to each other. Third face 103 is disposed at the ends of first face 101 and second face 102 extending along virtual straight line L, and extends along a direction perpendicular to virtual straight line L. Namely, third face 103 extends along a width direction of main body 10.

Main body 10 includes at least one first clamping portion 11, a receiving space 12, and at least one second clamping portion 13. First clamping portion 11 and receiving space 12 are respectively disposed at two opposite ends of main body 10 along virtual straight line L.

First clamping portion 11 is disposed at an end of first face 101 distant to third face 103. First clamping portion 11 extends along the direction perpendicular to virtual straight line L and is adapted to clamp rod body A2 of tool A. Receiving space 12 is disposed at another end of first face 101 and penetrates main body 10 to form openings on first face 101, second face 102, and third face 103. Thus, third face 103 is disposed at a terminal end of main body 10 and is adjacent to receiving space 12. Second clamping portion 13 is disposed on third face 103 and is located between first clamping portion 11 and receiving space 12. In the embodiment, main body 10 may include eight first clamping portions 11 and eight second clamping portion 13. Eight first clamping portions 11 and eight second clamping portion 13 are arranged along an extending direction of third face 103.

First clamping portion 11 includes a first clamping recess 111, a first hook 112, and a second hook 113. First clamping recess 111 is formed between first hook 112 and second hook 113 and extends along virtual straight line L to be adapted to clamp rod body A2 of tool A. First hook 112 and second hook 113 are able to elastically deviate relative to first face 101 for clamping rod body A2 of tool A. Second clamping portion 13 includes a second clamping recess 131 extending along virtual straight line L to communicate with first clamping recess 111 and is adapted to clamp rod body A2 of tool A.

Magnetic assembly 20 is mounted on one end of main body 10 opposite to first clamping portion 11 along virtual straight line L. Magnetic assembly 20 includes at least one magnetic member 21 and a magnetic conducting member 23. In the embodiment, magnetic assembly 20 may include a single magnetic member 21 extending along the extending direction of third face 103. Magnetic member 21 and magnetic conducting member 23 are arranged in receiving space 12 and are threadedly connected to main body 10. Second end A3 of tool A is adapted to be attached to magnetic member 21 via a magnetic force provided by magnetic member 21.

Thus, rod body A2 of tool A can be clamped by first clamping portion 11 and second clamping portion 13, and second end A3 of tool A can be attached to magnetic member 21 via a magnetic force to prevent tool A from being detached from the tool rack due to vibration or swaying. Moreover, magnetic conducting member 23 is made of metal material and is located adjacent to second face 102. Magnetic conducting member 23 is abutted against magnetic member 21 and is adapted to attach to metal objects, such as the tool cart and the metal cabinet via the magnetic force provided by magnetic member 21.

Figure 1:
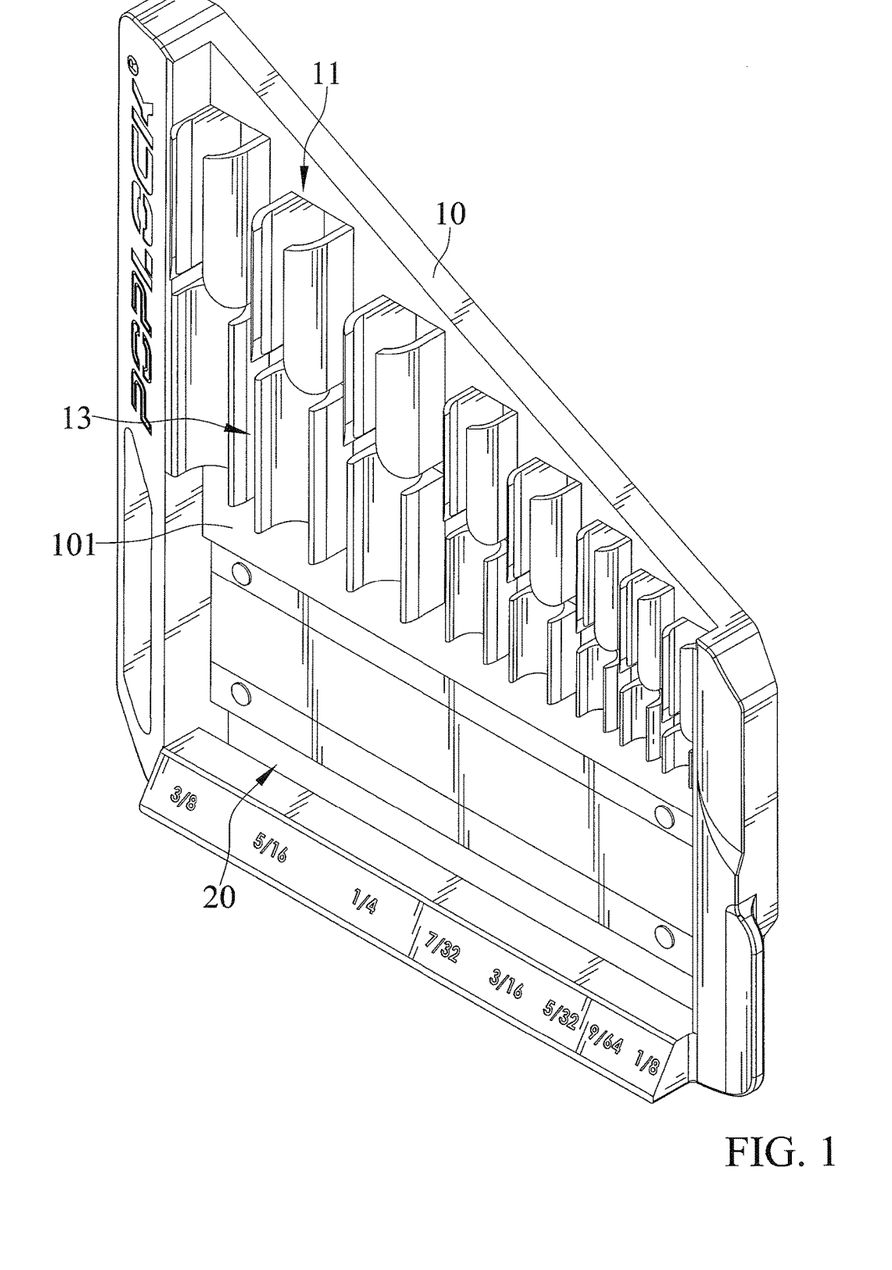
FIG. 1 is a perspective view of a tool rack of a first embodiment according to the present invention.
Figure 2:
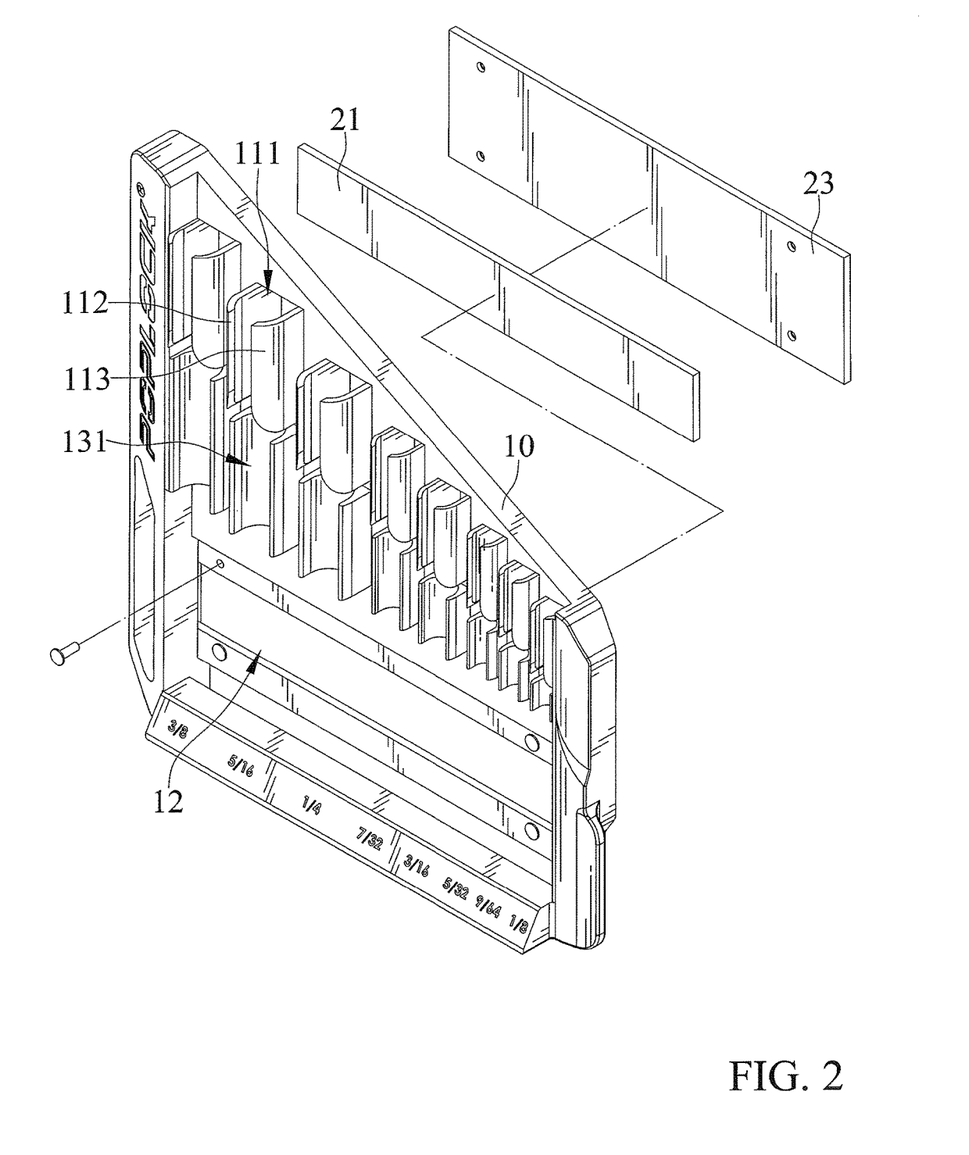
FIG. 2 is an exploded, perspective view of the tool rack of FIG. 1.
Figure 3:
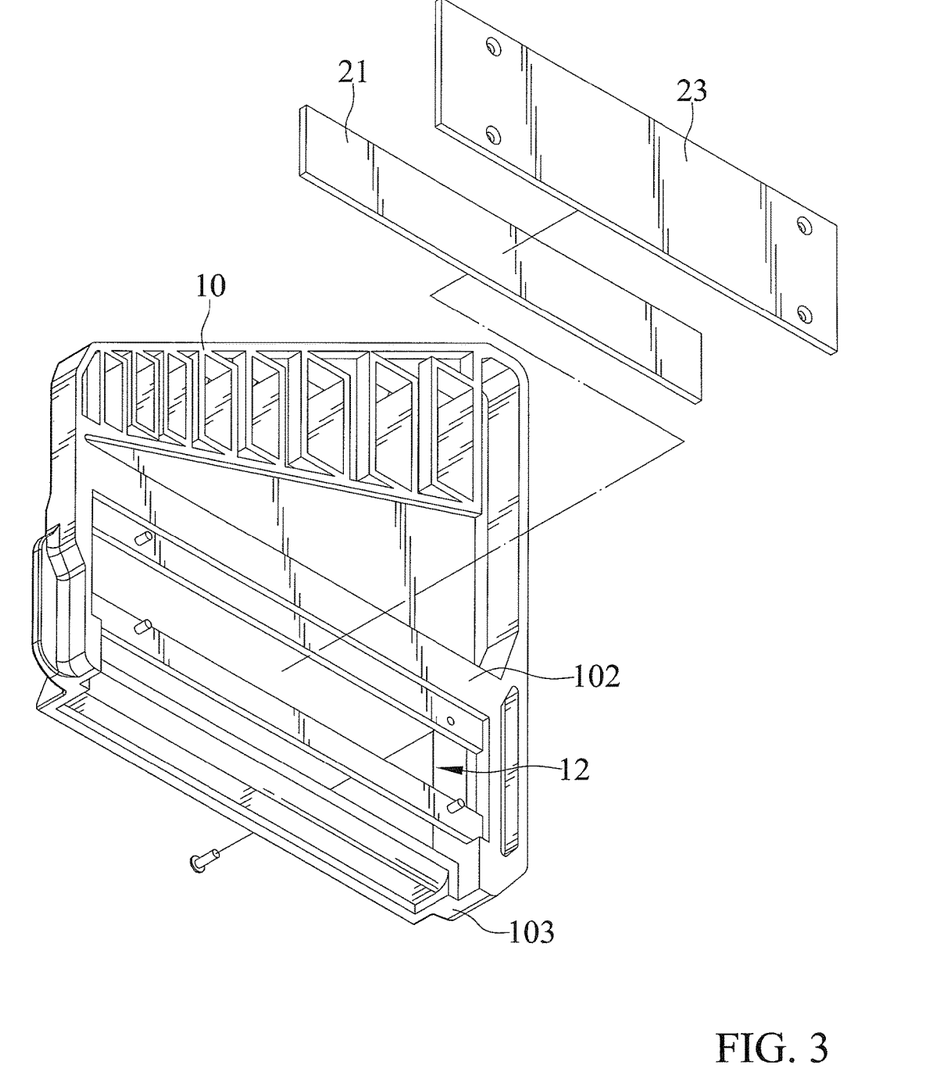
FIG. 3 is another exploded, perspective view of the tool rack of FIG. 1.
Figure 4:
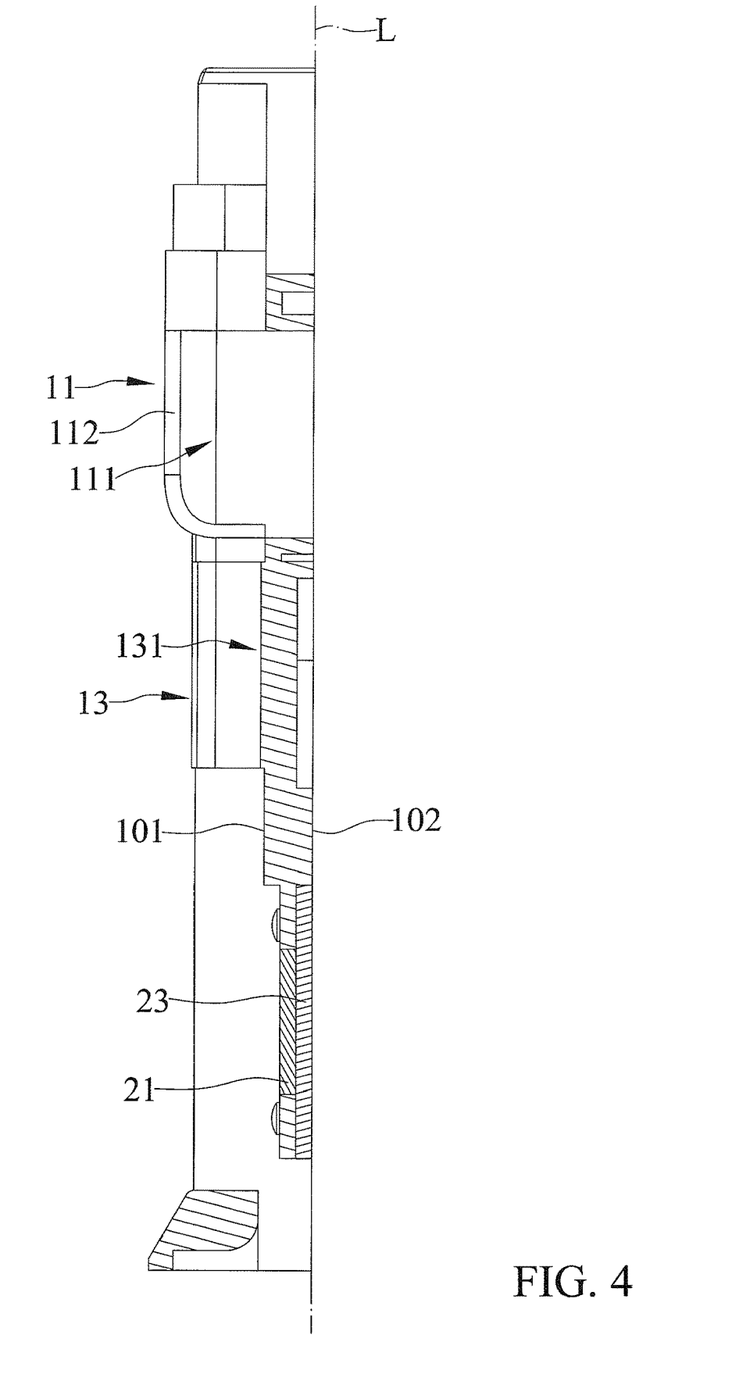
FIG. 4 is a cross-sectional view of the tool rack of FIG. 1.
Figure 5:
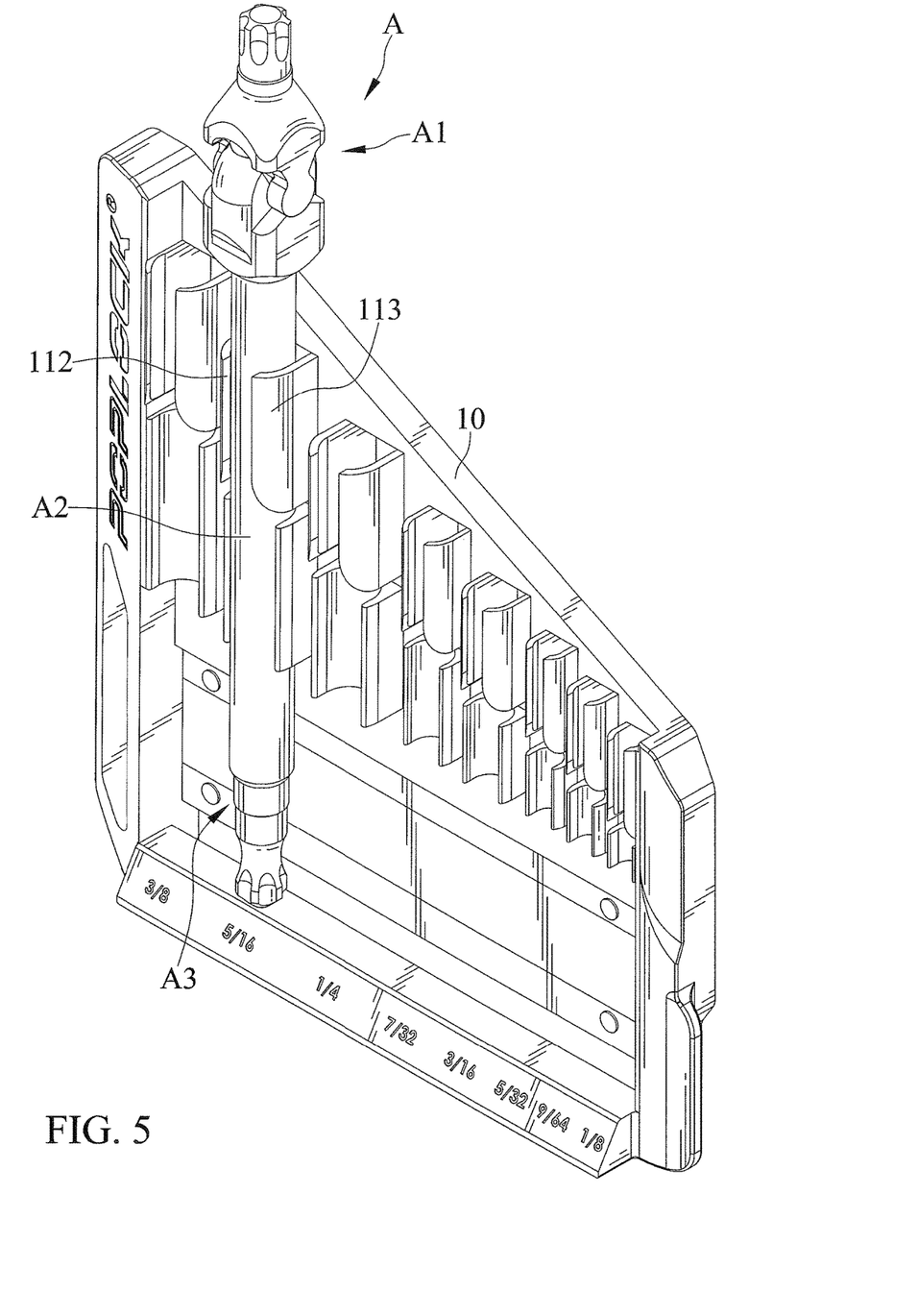
FIG. 5 is a perspective view of the tool rack of FIG. 1 and illustrates a tool attached and placed to the tool rack.
Figure 6:
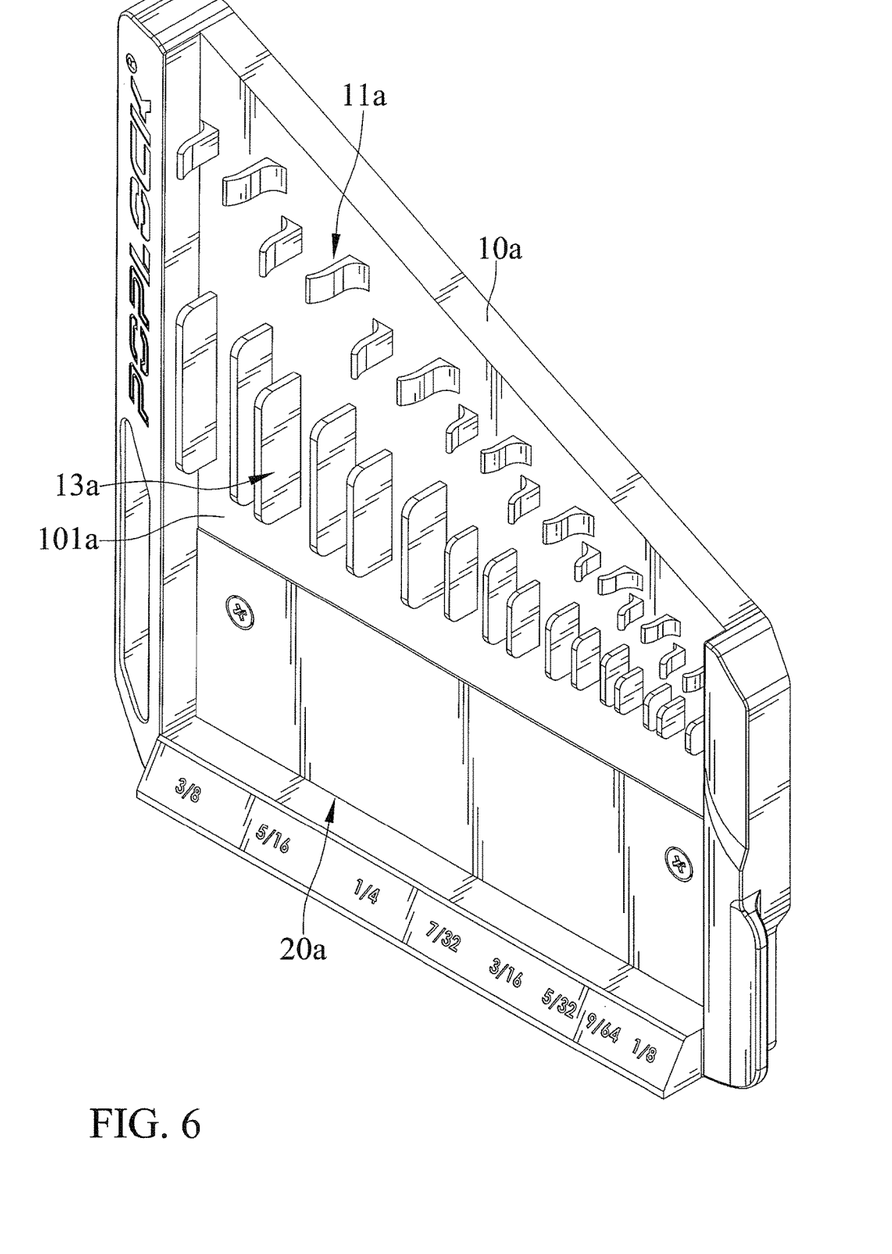
FIG. 6 is a perspective view of a tool rack of a second embodiment according to the present invention.
Figure 7:
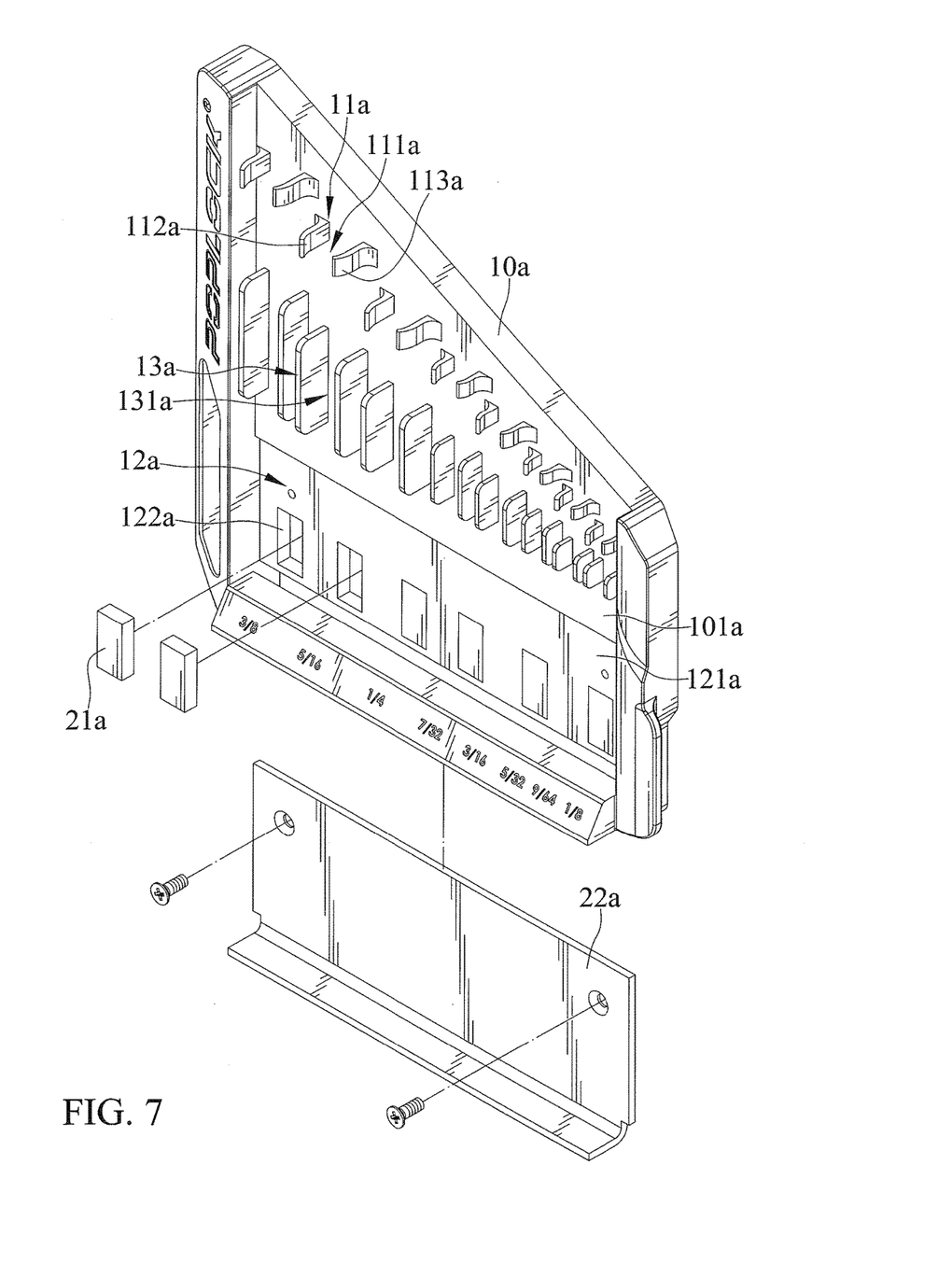
FIG. 7 is an exploded, perspective view of the tool rack of FIG. 6.
Figure 8:
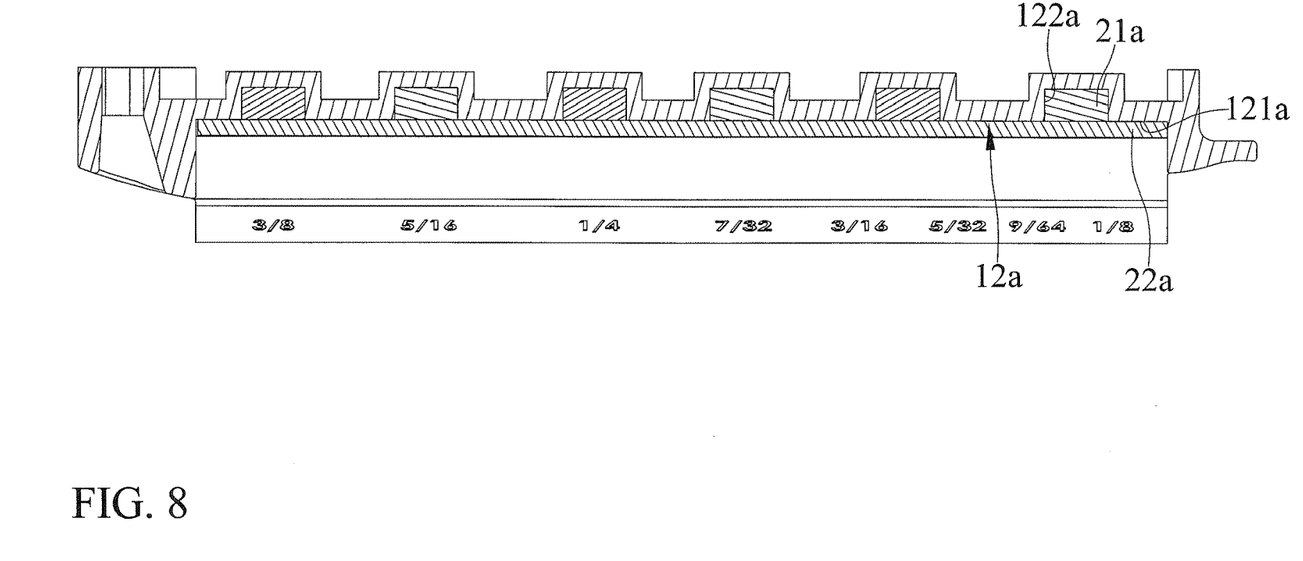
FIG. 8 is a cross-sectional view of the tool rack of FIG. 6.

FIGS. 6-8 show a tool rack in accordance with a second embodiment of the present invention. Main body 10a of the second embodiment includes at least one second clamping portion 13a disposed between first clamping portion 11a and magnetic assembly 20a and including second clamping recess 131a. First clamping portion 11a includes a first clamping recess 111a, a first hook 112a, and a second hook 113a. First clamping recess 111a is formed between first hook 112a and second hook 113a and communicates with second clamping recess 131a of second clamping portion 13a for clamping tool A shown in FIG. 5. In the embodiment, main body 10a may include eight first clamping portions 11a and eight second clamping portion 13a.

The second embodiment is generally similar to the first embodiment except that receiving space 12a is integrally and depressedly formed on first face 101a of main body 10a and includes a first receiving recess 121a and at least one second receiving recess 122a communicated with first receiving recess 121a.

Magnetic conducting member 22a is arranged in first receiving recess 121a and threadedly connected to main body 10a. Magnetic conducting member 22a abuts against magnetic member 21a. Magnetic member 21a is arranged in second receiving recess 122a. In the embodiment, receiving space 12a includes six second receiving recesses 122a arranged along the width direction of main body 10a, and magnetic assembly 20a includes six magnetic members 21a respectively arranged in six first receiving recesses 121a to reduce the material costs of a single big wide magnet.

Figure 9:
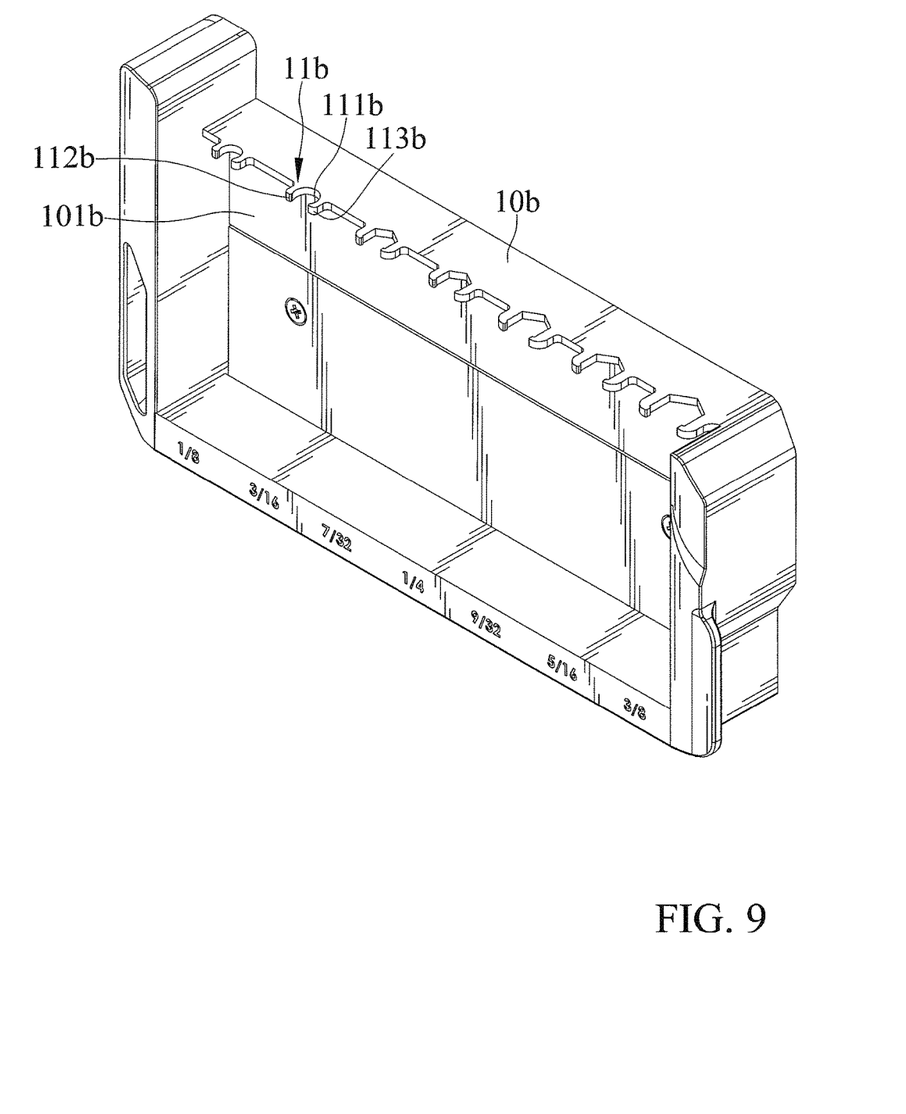
FIG. 9 is a perspective view of a tool rack of a third embodiment according to the present invention.

FIG. 9 shows a tool rack in accordance with a third embodiment of the present invention. The third embodiment is generally similar to the first embodiment except that first clamping portion 11b is integrally formed on main body 10b along a direction perpendicular to first face 101b. First clamping portion 11b includes a first clamping recess 111b, a first hook 112b, and a second hook 113b. First clamping recess 111b is formed between first hook 112b and second hook 113b. First hook 112b and second hook 113b are integrally formed on first face 101b and extend along the direction perpendicular to first face 101b. First hook 112b and second hook 113b are able to elastically deviate relative to first face 101b for clamping tool A shown in FIG. 5.

While various embodiments have been described above, it should be understood that they have been presented by way of example only, and not limitation. Thus, the breadth and scope of the preferred embodiments should not be limited by any of the above-described exemplary embodiments.

What is claimed is:

1. A tool rack comprising:
a main body including a first face extending along a virtual straight line, at least one first clamping portion disposed at an end of the first face and extending along a direction perpendicular to the virtual straight line, and a receiving space disposed at another end of the first face and forming an opening, wherein the main body includes a second face disposed opposite to the first face and a third face disposed at a terminal end of the main body and adjacent to the receiving space, wherein the receiving space penetrates the main body to form an opening on the second and third faces, wherein the receiving space is integrally formed as a depression on the first face and includes a first receiving recess and at least one second receiving recess communicated with the first receiving recess; and
a magnetic assembly including at least one magnetic member arranged in the receiving space and a magnetic conducting member arranged in the first receiving recess, wherein the at least one magnetic member is arranged in the second receiving recess.

2. The tool rack as claimed in claim 1, wherein the third face extends along a width direction perpendicular to the virtual straight line, wherein the third face extends along an extending direction perpendicular to the width direction and the virtual straight line, wherein the main body includes eight first clamping portions arranged along the extending direction, and wherein the at least one magnetic member extends along the extending direction.

3. The tool rack as claimed in claim 1, wherein the magnetic conducting member abuts against the at least one magnetic member, and wherein the magnetic conducting member is made of metal material and is located adjacent to the second face.

4. The tool rack as claimed in claim 1, wherein the main body includes at least one second clamping portion disposed between the at least one first clamping portion and the magnetic assembly, and wherein the at least one second clamping portion includes a second clamping recess extending along the virtual straight line.

5. The tool rack as claimed in claim 4, wherein the at least one first clamping portion includes a first clamping recess, a first hook, and a second hook, wherein the first clamping recess is formed between the first hook and the second hook and extends along the virtual straight line to communicate with the second clamping recess, and wherein the first hook and the second hook elastically deviate relative to the first face.

6. The tool rack as claimed in claim 4, wherein the at least one first clamping portion includes a first clamping recess, a first hook, and a second hook, wherein the first clamping recess is formed between the first hook and the second hook, wherein the first hook and the second hook are integrally formed on the first face and extend along a direction perpendicular to the first face, and wherein the first hook and the second hook elastically deviate relative to the first face.

* * * * *